Patented Sept. 21, 1954

2,689,830

UNITED STATES PATENT OFFICE 2,689,830

BURN-RESISTANT LUMINESCENT PRODUCT
AND METHOD OF MAKING THE SAME

Meier Sadowsky, Elkins Park, and Miriam G. Groner, Doylestown, Pa., assignors to Philco Corporation, Philadelphia, Pa., a corporation of Pennsylvania No Drawing. Application February 26, 1951,
Serial No. 212,836

20 Claims. (Cl. 252—301.4)

1

The present invention relates to phosphors of improved resistance to darkening in the presence of radiation, and particularly to luminescent screens prepared from such phosphors. The invention also relates to a method for treating phosphors to impart marked resistance to darkening thereto and for preparing luminescent screens possessing marked resistance to darkening in the presence of radiation. Herein and in the claims the term "luminescent screen" will be understood to refer to a coating of phosphor material on any supporting surface. The present application is a continuation-in-part of application Serial Number 145,086, filed February 18, 1950, now abandoned.

Luminescent screens such as employed in fluorescent lamps; X-ray fluoroscopes and intensifiers; luminous markers, dials and indicators, cathode-ray tubes, including those used in oscilloscopes, television, radar, and the like; are well known. Such screens comprise a layer of fine crystals of phosphor material which is capable of absorbing energy and of re-emitting it in visible radiation while maintaining a temperature below that required for incandescence. However, a difficulty has existed which has substantially limited the useful life of such screens. This difficulty manifests itself as a progressive darkening of the screen and a consequent loss in light output thereof.

This difficulty is a particular problem where the screen is subjected to impingement of electrons as when it is the luminescent screen of a cathode-ray tube, especially a television cathode-ray tube. The above-mentioned loss in light output renders it difficult to view the images displayed upon the screen and, at times, appears to cause some degradation of the image definition. It has been recognized that the above-said darkening involves a burning of the screen as a result of the impingement of the electron beam thereon. Certain earlier approaches to the problem were concerned with attempts to cure the defect rather than the prevention thereof. The present invention is primarily concerned with preventing the darkening and loss in light output referred to in luminescent screens.

It is an object of the present invention to provide a phosphor material possessing marked resistance to darkening upon being subject to radiation.

A further object is to provide a method for treating phosphors to impart thereto marked resistance to darkening in the presence of radiation.

A further object is to provide a luminescent screen possessing marked resistance to darkening upon being subjected to radiation.

Another object is to provide a method for preparing luminescent screens of enhanced resistance to darkening in the presence of radiation.

A specific object is to provide luminescent screens for use in cathode-ray tubes having marked resistance to darkening when subjected to electron impingement, and to a method for preparing such screens.

Still another specific object is to provide a method for depositing phosphor material from a liquid suspension thereof onto a glass surface to provide a luminescent screen possessing enhanced resistance to darkening in the presence of electron impingement.

Other objects will be apparent from a consideration of the following specification and claims.

In accordance with the present invention, the phosphor material, in particle form, is wetted with a solution comprising a persulfate selected from the group consisting of ammonium persulfate and potassium persulfate, whereby the persulfate is adsorbed on the crystal structure of the phosphor material, following which the solvent is removed. The resulting product thus comprises phosphor crystals having the persulfate adsorbed thereon.

It has been found that phosphor material when treated in accordance with the present invention possesses marked resistance to darkening in the presence of radiation, and in particular, it has been found that luminescent screens prepared from such phosphor material possess a much longer life than ordinary luminescent screens. The invention is of especial utility in the preparation of luminescent screens for use in devices wherein the screen will be subjected to impingement of electrons, such as for example, the screen of a television cathode-ray tube, since it is in such instances where darkening of ordinary phosphor screens is generally most pronounced. The exact reason for the advantageous results of the present invention is not fully understood, however, in view of the results obtained, the following theory is advanced by way of explanation. Phosphors are crystalline inorganic compounds, the cation of which is a metal such as zinc, cadmium, barium, strontium, magnesium, beryllium, zirconium, combinations of these, and the like. While the metal is in ionic form, the phosphor is relatively non-light-absorbent, and possesses relatively good secondary emission properties as well as luminescent properties. It is believed that the darkening is the result of the reduction of the phosphor to provide the metal cation in its elemental metallic state. Taking for example, a zinc sulfide phosphor, it is believed that the zinc ion is reduced to metallic zinc. Such metallic atoms are both light-absorbent and non-luminescent and thus their presence results in a lowering of luminescent efficiency of the screen. Moreover, such metallic atom possesses low secondary emission properties, and therefore becomes saturated with electrons thus serving as a focal point for the reduction of adjacent metal ions. Thus, it is believed that the reduction of the metal ions is progressive and cumulative. In time, sufficient metal ions have become reduced to provide a marked darkening of the phosphor, or of a screen prepared from such phosphor. It is believed that the adsorption by the phosphor crystal of the persulfate in accordance with the present invention not only converts any metal atom which may be present in the phosphor to the metal ion, thus eliminating it as a potential focal point for the reduction of adjacent ions, but also prevents, or at least greatly retards, the reduction of the metal ion when the phosphor is subjected to radiation. In view of the progressive nature of the reduction of the phosphor compound upon being subjected to radiation, the conversion of any reduced metal to its ion is a significant factor. At any rate, as stated, a luminescent screen, in which the phosphor crystals have adsorbed thereon the persulfate of the type stated, has been found to possess markedly increased resistance to darkening when subject to radiation.

Referring specificaly to the phosphors, such materials are well known in the art. Phosphors are crystalline inorganic materials which possess the property of luminescence, that is, they are capable of emitting visible light at temperatures below that of incandescence upon being excited by external energy. In addition, phosphors normally possess good secondary emission properties and are good insulators. Phosphors can be generally divided into two main classes, namely oxygen-containing inorganic compounds, the cation of which is a metal, and the metal sulfides. Examples of phosphors falling within the first general class are the oxides, such as zinc oxide; the silicates, such as cadmium silicate, zinc silicate, zinc beryllium silicate, magnesium silicate, calcium magnesium silicate, and the like; the tungstates such as calcium tungstate, and the like; the germanates, such as zinc germanate, zinc beryllium germanate, zinc zirconium germanate, and the like; the phosphates such as zinc phosphate, and the like. Examples of the second general class of the phosphors mentioned above namely the sulfides, are zinc sulfide, cadmium sulfide, calcium sulfide, barium sulfide, strontium sulfide, and the like. As is well known it is often the practice to use two or more of these materials together to form a phosphor mixture or a multi-layer phosphor screen. For example, several sulfides may be mixed together such as zinc sulfide and cadmium sulfide; or several of the oxygen-containing type of phosphors may be mixed together, such as the case when different silicates, e. g. zinc beryllium silicate and calcium magnesium silicate, are employed together. Moreover, one or more of the oxygen-containing phosphors may be used with one or more of the sulfide phosphors as for example, a phosphor screen containing zinc sulfide, cadmium sulfide and zinc oxide, and a phosphor screen containing mixed sulfides and silicates, for instance zinc sulfide and zinc beryllium silicate. As is also well known, the above-mentioned phosphors are often activated by incorporating therein a very small amount of a metal. The activating metal depends upon the particular phosphor, for example, in the sulfide phosphors mentioned above, the activating metal may be silver, while the oxygen-containing phosphors may be activated with manganese, titanium or cerium.

The phosphor material with which the present invention is concerned will have a relatively fine particle size, since it is such material which is most receptive to the treatment of the present invention and which is employed in the preparation of luminescent screens. The particle size of the phosphor material will generally be less than about 50 microns and may go all the way down to submicron size.

Referring to the preparation of luminescent screens from phosphor material, there is a wide variety of procedures, well known in the art, for accomplishing this. As a general proposition, it may be stated that all these procedures involve depositing the phosphor material on a surface, normally termed the "substrate." In most applications, particularly in the case of luminescent screens for cathode-ray tubes, the substrate is transparent material such as glass. The procedures may be generally divided into two main types, one involving the employment of the phosphor material in dry form, and the other involving the use of the phosphor suspended in a liquid medium. The first general group of procedures includes dusting, that is settling in air or other gaseous medium. In this procedure the substrate is usually made tacky by the application of a binding material and the dry phosphor material is allowed to fall onto or roll over the surface, adhering thereto. In a variant of the foregoing dusting procedure, a binder is first applied to the substrate and the phosphor, in dry powdered form, is blown from a gun onto the tacky surface. Another procedure of the same general type involves electrostatic deposition wherein the dry phosphor material and the substrate are oppositely charged to that the phosphor particles are attracted to the substrate.

The second general group of procedures referred to above for depositing the phosphor involve, as stated, the use of a suspension of the phosphor material in a liquid medium. In one procedure, the phosphor is suspended in a volatile liquid such as acetone, butyl alcohol, amyl alcohol, and the like, an organic film-forming material such as nitrocellulose, polystyrene, and the like being included as a binder, if desired, and the mixture is applied to the substrate as by spraying, brushing, or the like. In another procedure a slurry of the phosphor in a binder and diluent is applied to the substrate and distributed by flowing or swirling around the surface until a fairly even coating has been obtained. Any excess slurry is then removed. In another procedure, a slurry or paste of the phosphor material may be applied to the substrate by forcing it through the openings in a silk cloth. A further procedure, which is the procedure generally employed in the television cathode-ray tube industry, and which is the preferred procedure in accordance with the present invention as will hereinafter be more fully discussed, involves the settling of the phosphor from a suspension thereof in a liquid onto the substrate. After the phosphor material has settled out onto the substrate, the liquid is removed by decantation, syphoning, evaporation, and the like, leaving the deposited screen behind. A binder is usually included in the suspension and in many cases, an electrolyte which lowers the zeta potential of the phosphor and of the substrate is incorporated in the suspension.

The screen prepared in any of the foregoing procedures will, of course, be dried to remove excess liquid. In many cases it may be desirable to employ heat to facilitate the removal of water and to set any binder as for example, in the case where a silicate binder is employed. In this case it is often desirable to bake the screen at temperatures above 212° F.

The phosphor screen of the present invention may be prepared by any of the foregoing procedures, it being only necessary that the phosphor material at some stage in the manufacture of the screen, be treated with the solution of the persulfate as herein described. For instance, the phosphor material itself, in relatively fine particle size, may be mixed with a solution comprising the persulfate to permit the persulfate to be adsorbed on the crystalline structure of the phosphor, after which the excess solution and solvent are removed. The phosphor may then be deposited to form the screen in any of the known manners. On the other hand, the screen may first be deposited following which the screen containing the phosphor is contacted with a solution comprising the persulfate to permit the phosphor material to adsorb the persulfate on the crystalline structure thereof. The excess solution and solvent are then removed from the treated screen. The preferred method for treating the phosphor material in accordance with the present invention involves contacting the phosphor material with the solution comprising the persulfate during the deposition of the screen. This may be accomplished, following the second general group of deposition procedures discussed above, by incorporating the persulfate in the liquid medium containing the phosphor material. In this case the liquid medium will be such as to dissolve the persulfate. Preferably for this purpose, water is selected as at least the predominant liquid component of the liquid medium. The liquid medium containing the phosphor material in suspension and the persulfate in solution can then be applied to the substrate by any convenient method, and by the time the phosphor screen is deposited, the phosphor will have the persulfate adsorbed thereon.

In this connection, as stated previously, a preferred procedure for treating the phosphor and for depositing the screen, involves the settling of the phosphor onto the substrate from a suspension thereof in a liquid, preferably water. In this case, the persulfate may be dissolved in the liquid medium from which the phosphor is settled. A binder, soluble in the liquid medium, is normally employed to provide proper adherence between the phosphor and the substrate. The binder most generally used for this purpose is a soluble silicate such as potassium silicate, sodium silicate, ethyl silicate, or the like; although in the event an organic solvent is employed, an organic binder, such as a cellulose derivative, particularly cellulose nitrate, may be employed. Of these materials, potassium silicate is preferred. As stated above, there is also often incorporated in the settling medium an electrolyte to lower the zeta potential of the phosphor and of the substrate, and, when a silicate is employed as a binder, to cause it to gel. Such an electrolyte may be any of the simple water soluble acids, bases or salts such as acetic acid, ammonium hydroxide, lithium hydroxide, sodium sulfate, ammonium carbonate, barium acetate, and the like. In acordance with the present invention the persulfate may serve as some or all of the electrolyte, as will be discussed more fully hereinafter.

The wetting of the phosphor particles with the solution comprising a persulfate will present no problem to those skilled in the art. For example, where the phosphor itself is treated either before the screen is deposited or after the screen is deposited, all that is necessary is that the persulfate be dissolved in a solvent, such as water, and the resulting solution mixed with or applied to the phosphor particles in an amount sufficient to wet the particles. The concentration of the persulfate in the solution may vary widely depending upon the nature of the phosphor material, the amount of solution employed, and the like. In general, the concentration of the persulfate in the solution may be relatively small, for example, it may be as low as about 0.1%, by weight. The upper limit for concentration of the persulfate in the solution is relatively unimportant inasmuch as the adsorptive power of the phosphor is determined by the nature of the phosphor material and defines the maximum amount of material that can be adsorbed. For this reason, the maximum concentration of the persulfate in the solution is dependent primarily upon the solubility of the persulfate in the particular solvent. In this connection, however, where the persulfate is present in the depositing medium during the depositing of the phosphor, excessive amounts of the persulfate may have no beneficial effect upon the other components of the medium. For instance, when a soluble silicate is employed as binder it has been found that the zeta potential will be reduced to a minimum upon the addition of a definite amount of the electrolyte and that additional electrolyte will not reduce the zeta potential significantly. In addition, excess electrolyte may accelerate gelation of the silicate binder to an undesirable extent. The foregoing considerations are well known to those skilled in the art and will be borne in mind in selecting the proportion of persulfate when that material functions as a portion or all of the electrolyte. In this case, therefore, the concentration of the persulfate in the solution will generally not exceed about 5%, preferably not over about 3%.

Further in connection with the solution of persulfate, it has been found that the pH of the solution has an effect upon the results obtained in treating the phosphor therewith. In other words, it has been found that if the solution has a pH between about 7 and about 10, the increase in resistance to burning in the presence of radiation is at a maximum, other conditions being equal. The addition of ammonium persulfate to water, ordinarily provides a pH within this range. With potassium persulfate, however, a pH somewhat higher normally results, and for this reason, it may be desirable to adjust the pH to within this range by the addition of a small amount of acidic material. While any acidic material may be used for this purpose, the volatile weak acids, such as acetic acid, are preferred.

As is well recognized in the art, certain materials have a deleterious influence on phosphors, luminescent screens prepared therefrom, and devices utilizing the film. In some cases, when, for example, nitrates are present in a screen of a television tube, the screen may tend to evolve gas during use of the tube. Where, for example, halogens are present the cathode may be deleteriously affected by evolution of the halogen and its migration to the cathode surface. It will be understood, therefore, that in the practice of the invention such materials will not be employed in the treatment of the phosphor or in the preparation of the screen where the presence of such materials will deleteriously affect the product.

The present invention will be more readily understood from a consideration of the following specific examples which are given by way of illustration and which are not intended to limit the scope of the invention in any way.

*Example I*

A stock solution is prepared comprising 64 grams of ammonium persulfate, 75 milliliters of 14% potassium silicate having a specific gravity of 1.11 and 5625 milliliters of distilled water. 2900 milliliters of this solution are mixed with 1700 milligrams of a phosphor consisting of a mixture of zinc sulfide and cadmium sulfide activated with about .01% of silver. The resulting suspension is introduced into a tube blank bearing R. M. A. designation 10BP4. The suspension is allowed to settle for one hour after which the supernatant liquid is decanted on a vibrationless tilting table. The glass envelope is then inverted and the screen is dried and the tube processed in accordance with normal production procedures. In this procedure the ammonium persulfate functions also as the electrolyte to lower the zeta potential of the phosphor and of the glass substrate. The tube exhibited no burn after a thousand hours operation at 9 kilivolts second anode potential, 250 volts first anode potential, 6.3 volts filament and 60 microamperes plate current.

A tube prepared by following the foregoing procedure, using, however, ammonium sulfate in place of the ammonium persulfate, exhibited a burn within 144 hours.

In another instance where the same procedure as above was followed using, however, sodium sulfate in place of the ammonium persulfate, the resulting tube exhibited a burn within 24 hours.

*Example II*

The same procedure was followed as in Example I using the zinc sulfide-cadmium sulfide phosphor, using however, potassium persulfate in place of the ammonium persulfate of Example I. The resulting tube exhibited no burn until about 336 hours had elapsed under the same conditions of testing.

*Example III*

Following the procedure of Example I, employing the zinc sulfide-cadmium sulfide phosphor, potassium persulfate was again used. In this case, however, the pH of the settling medium was adjusted to between 7 and 10 by the addition of acetic acid. The resulting tube showed no burn after several hundred hours, and after 500 hours only exhibited burn when the voltage of the anode was reduced to 5 kilivolts.

*Example IV*

The procedure of Example I was followed using ammonium persulfate, but, however, employing a calcium magnesium silicate phosphor activated with titanium. In this case the amount of phosphor employed was about one-third the weight of that employed in Example I in view of the fact that the phosphor was smaller in particle size and equivalent coverage was achieved with less weight. The resulting tube exhibited no burn until well over 300 hours of operation.

A tube prepared following this procedure, but employing sodium sulfate in place of the ammonium persulfate, exhibited a burn after 144 hours.

*Example V*

The procedure of Example I was followed using ammonium persulfate, but, however, employing a calcium tungstate phosphor. In this case the amount of phosphor employed was about one-third the weight of that employed in Example I. The resulting tube exhibited a slight appearance of burning after 24 hours which do not appear to increase during the next hundred hours of testing; whereas a similar tube prepared using sodium sulfate in place of the ammonium persulfate developed a much darker burn after 24 hours which burn increased in intensity during the next hundred hours of testing.

Considerable modification is possible in the selection of the particular method of depositing the screen and of treating the phosphor, in the selection of the particular phosphor, and in the selection of the particular materials employed in depositing the screen without departing from the scope of the invention.

We claim:

1. The method of increasing the resistance of crystalline phosphor material to darkening in the presence of radiation which comprises wetting the crystalline phosphor material with a solution comprising a persulfate selected from the group consisting of ammonium persulfate and potassium persulfate in a concentration of at least about 0.1%, by weight, and thereafter drying said wet phosphor material.

2. The method of claim 1 wherein said persulfate is ammonium persulfate.

3. The method of claim 1 wherein said persulfate is potassium persulfate.

4. The method of claim 1 wherein the pH of said solution is between about 7 and about 10.

5. A phosphor material possessing marked resistance to darkening in the presence of radiation comprising crystalline phosphor material having a persulfate selected from the group consisting of ammonium persulfate and potassium persulfate adsorbed on the crystalline structure thereof and resulting from wetting said phosphor with a solution of said persulfate in a concentration of at least about 0.1%, by weight.

6. The product of claim 5 wherein said persulfate is ammonium persulfate.

7. The product of claim 5 wherein said persulfate is potassium persulfate.

8. In the preparation of a luminescent phosphor-containing screen which comprises the deposition of crystalline phosphor material in relatively fine particle size on a supporting surface, the steps which comprise wetting said crystalline phosphor material with a solution comprising a persulfate selected from the group consisting of ammonium persulfate and potassium persulfate in a concentration of at least about 0.1%, by weight, and hereafter drying the wet phosphor material.

9. The method of claim 8 wherein said persulfate is ammonium persulfate.

10. The method of claim 8 wherein said persulfate is potassium persulfate.

11. The method of claim 8 wherein the pH of said solution is between about 7 and about 10.

12. A luminescent screen comprising crystalline phosphor material particles having a persulfate selected from the group consisting of ammonium persulfate and potassium persulfate adsorbed on the crystalline structure thereof and resulting from wetting said phosphor with a solution of said persulfate in a concentration of at least about 0.1%, by weight.

13. The product of claim 12 wherein said persulfate is ammonium persulfate.

14. The product of claim 12 wherein said persulfate is potassium persulfate.

15. The method of preparing a phosphor-containing luminescent screen which comprises permitting crystalline phosphor material in relatively fine particle size to settle onto a substrate from a liquid medium, said liquid medium comprising a solution comprising a persulfate selected from the group consisting of ammonium persulfate and potassium persulfate in a concentration of at least about 0.1%, by weight, removing excess liquid from said settled phosphor material and drying said phosphor material.

16. The method of claim 15 wherein said persulfate is ammonium persulfate.

17. The method of claim 15 wherein said persulfate is potassium persulfate.

18. The method of claim 15 wherein said liquid medium has a pH between about 7 and about 10.

19. A luminescent screen comprising a glass surface having a film thereon comprising crystalline phosphor material having a persulfate selected from the group consisting of ammonium persulfate and potassium persulfate adsorbed on the crystalline structure thereof and resulting from wetting said phosphor with a solution of said persulfate in a concentration of at least about 0.1%, by weight.

20. The luminescent screen of claim 19 wherein said persulfate is ammonium persulfate.

References Cited in the file of this patent

UNITED STATES PATENTS

| Number | Name | Date |
|---|---|---|
| 2,119,309 | Batchelor | May 31, 1938 |
| 2,161,458 | DeBoer et al. | June 6, 1939 |
| 2,312,265 | Roberts | Feb. 23, 1943 |
| 2,451,590 | Tidik | Oct. 14, 1948 |
| 2,523,026 | Jones | Sept. 19, 1950 |
| 2,573,051 | Pakswer | Oct. 30, 1951 |